Oct. 28, 1952 R. R. THALNER 2,616,056

UNSYMMETRICAL DEFLECTION YOKE

Filed Feb. 9, 1951 2 SHEETS—SHEET 1

INVENTOR.
ROBERT R. THALNER
BY John P. Harvey
ATTORNEY

UNSYMMETRICAL DEFLECTION YOKE

Filed Feb. 9, 1951 2 SHEETS—SHEET 2

INVENTOR
ROBERT R. THALNER
BY John A. Harvey
ATTORNEY

Patented Oct. 28, 1952 2,616,056

UNITED STATES PATENT OFFICE 2,616,056

UNSYMMETRICAL DEFLECTION YOKE

Robert R. Thalner, Buffalo, N. Y., assignor to Sylvania Electric Products Inc., a corporation of Massachusetts Application February 9, 1951, Serial No. 210,167

4 Claims. (Cl. 313—75)

Figure 1:
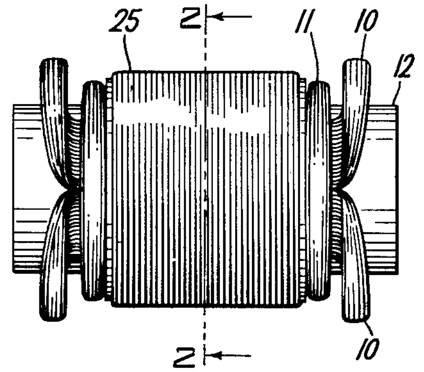

The present invention relates to magnetic scanning yokes for cathode-ray tubes and, particularly, to such yokes adapted to be energized with currents of saw-tooth waveform by which to deflect the cathode-ray beam of the tube over a wide deflection angle.

Magnetic scanning yokes are widely used in conventional television receivers by which to effect deflection of the cathode-ray beam of the tube in a raster of parallel lines forming the image reproducing area of the tube. It is desirable that the velocity of the scanning beam be uniform over the entire length of each scanned line, a condition ordinarily referred to as "linearity" of the scanning action. The term "linearity" as thus used essentially evolves from the concept that uniform velocity of scanning along the scanning line is ordinarily attained when the current which energizes each of the horizontal and vertical scanning windings has a "linear" saw-tooth waveform. The linearity of scanning in the vertical direction involves the relatively low frequency of 60 cycles per second together with relatively low scanning power requirements and thus does not present the same problems as are encountered in horizontal scanning. The latter occurs at a frequency of 15,750 cycles per second and, due to the wide angle of deflection usually required in present day short-length cathode-ray tubes, requires appreciable scanning power. These frequency and power considerations make it difficult to attain the desired high degree of linearity of horizontal scan and many arrangements have been proposed by which to overcome the linear scan problem.

One of these involves the use of a triode type of damper tube connected across the horizontal scanning winding of the scanning yoke. A complex network is also connected across the scanning yoke and is so connected between the cathode and control electrode of the damper tube that the impedance of the latter constantly changes during the scanning cycle so to modify the waveform of the scanning current as to approximate the desired linear scanning action. This proposed arrangement effects more precise linear scan by electrical components in a particular electrical arrangement and consequently requires careful design and adjustment with resulting undue complication of the scanning system. A further disadvantage of this proposed arrangement is that the linearity is inherently interlocked with the picture size so that adjustment of one requires a corresponding adjustment of the other.

A somewhat simplified form of the linearity control arrangement last described utilizes a diode type of damper tube which is coupled to the scanning circuit through an inductor having two closely coupled sections. The scanning current flows through one section of the inductor to induce in the other section a voltage which in effect controls the impedance of the damper tube during the scanning cycle much as though the tube were of the triode type with its impedance controlled in the manner first described. This proposed method of linearity control has the inherent disadvantages mentioned with respect to the triode damper tube type of linearity control.

It is an object of the present invention to provide a magnetic scanning yoke in which all compensations required to effect good linearity of horizontal scan are constructed into the yoke so that linearity of scan is corrected mechanically and the correction is always proper for a pre-established horizontal picture size.

It is a further object of the invention to provide a novel magnetic scanning yoke which permits the omission from the scanning system of any horizontal linearity control and thus effects the omission of one adjustment of the scanning system otherwise required.

It is an additional object of the invention to provide a new and improved magnetic scanning yoke which is adaptable to mass production techniques and does not involve a more costly construction than does the conventional scanning yoke.

For a better understanding of the present invention, together with other and further objects thereof, reference is had to the following description taken in connection with the accompanying drawing, and its scope will be pointed out in the appended claims.

Figure 2:
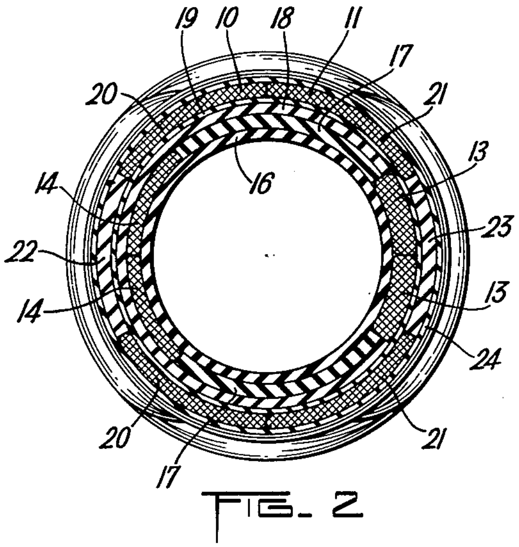
Figure 3:
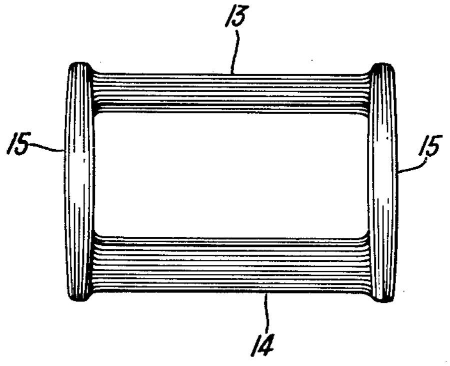
Figure 4:
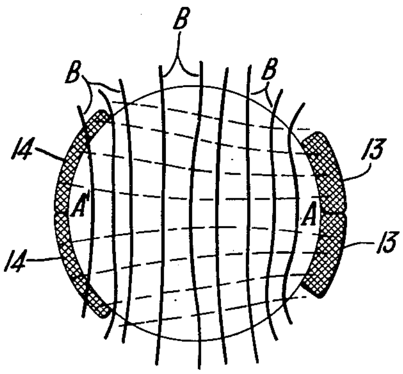

Referring now to the drawings, Fig. 1 illustrates a magnetic scanning yoke embodying the present invention; Fig. 2 is a transverse cross-sectional view of the Fig. 1 yoke construction; Fig. 3 illustrates one horizontal winding section utilized in the yoke; Fig. 4 represents the transverse cross-sectional configuration of the horizontal scanning winding of the Fig. 1 yoke and is used as an aid in explaining its operation; and Figs. 5 and 6 graphically represent the magnitudes of certain components of horizontal non-linearity caused by specific factors involved in the cathode-ray tube and yoke constructions and are used more clearly to explain the improvement effected by a yoke embodying the present invention.

Referring now more particularly to Figs. 1, 2 and 3 of the drawings, a magnetic scanning yoke embodying the present invention includes a horizontal scanning winding 10, 10 and a vertical scanning winding 11, 11 each having two winding sections of saddle-shaped configuration supported to saddle opposite sides of the neck 12 of a cathode-ray tube. The winding sections of the horizontal winding 10 each have the configuration shown in Fig. 3 and comprise opposing side or skirt portions 13, 14, which are positioned to lie on individual but approximately opposite sides of the neck 12 of the tube, and end portions 15, 15 partially encircling the tube neck. As more clearly shown in Fig. 2, the skirt portions 13 and 14 of each winding section 10 have the same cross-sectional volume but unequal cross-sectional dimensions in a plane normal to the axis of the tube neck. In particular, the skirt portion 13 has a greater radial depth and lesser circumferential width than does the skirt portion 14.

The horizontal winding sections 10, 10 are supported on a cylindrical form 16 of insulating material, one winding section being positioned in mirror symmetry with relation to the other so that the side or skirt portions 13, 13 of the winding sections are adjacent one another as are the skirt portions 14, 14. The winding sections 10, 10 are connected either in series or in parallel, as desired, with aiding magnetic fields.

The space between the skirt portions 13 and 14 of each winding section is filled with insulating material 17, 17 and a semi-cylindrical member 18 is positioned over the skirt portions 14, 14 and the filler members 17, 17 to provide with the skirt portions 13, 13 a surface of cylindrical configuration coaxial with the supporting member 16. A cylindrical member 19 of insulating material encloses the structure thus far described and insulates the horizontal winding sections 10, 10 from the vertical scanning winding which comprises sections 20, 21. These latter sections are likewise connected in series with aiding magnetic fields and, as will be pointed out hereinafter, may be of conventional symmetrical configuration supported in conventional relation one to the other or may be symmetrically positioned but have unequal numbers of turns. The "window" between the side or skirt portions of the winding sections 20 and 21 is filled with members 22 and 23 of insulating material, and a cylindrical member 24 of insulating material encloses the entire structure described. A plurality of turns of iron wire 25, Fig. 1, is layer-wound upon the cylindrical member 24 in conventional manner to provide a magnetic path of low reluctance surrounding the scanning yoke.

A scanning current flows through the horizontal scanning winding sections 10, 10 in series or in parallel to produce, due to the unsymmetrical configuration of the skirt portions 13 and 14 of the sections, a non-symmetrical magnetic field as indicated by the solid lines B in Fig. 4. By virtue of this field configuration, the flux density is higher at the point A than at the diametrically opposite point A', as indicated by the spacing of the lines B. Since the extent of the deflection of the cathode-ray beam varies directly with the flux density, it will be apparent that the deflection will be greater when the beam is projected through that area of the tube neck adjacent the skirt portions 13, 13 than when it is projected through that portion of the tube neck adjacent the skirt portions 14, 14. From the configuration of the magnetic field shown in Fig. 4, it will also be apparent that the amount of deflection decreases for any position of the beam across the tube neck in the direction from the point A to the point A'.

Figure 5:
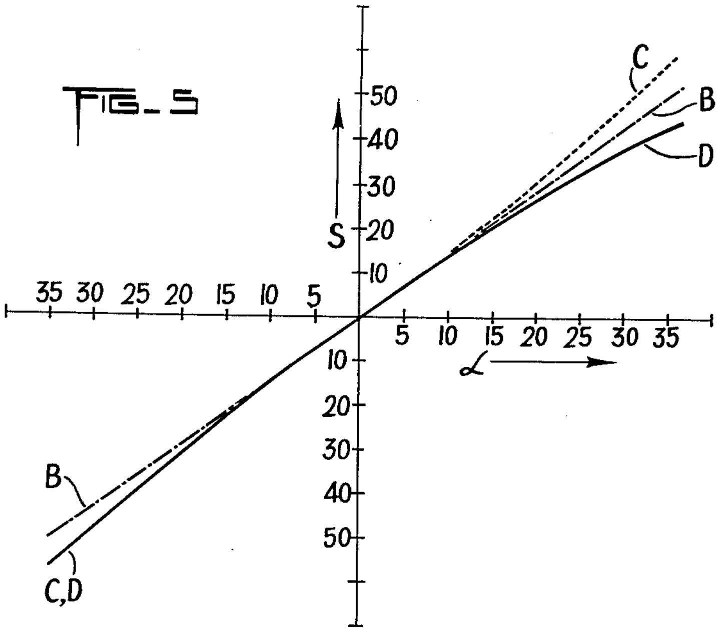
Figure 6:
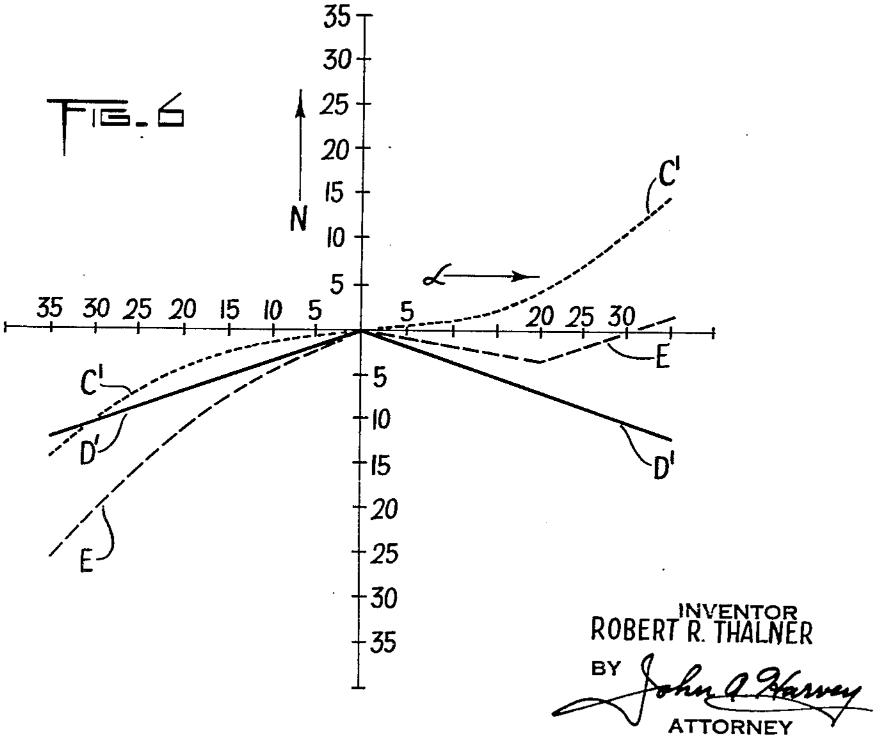

The reason for providing this magnetic field configuration will be more apparent from the following discussion of the graphs shown in Figs. 5 and 6. Fig. 5 is a graph in which $\alpha$, or the angle the cathode-ray beam subtends from an axial line down the center of the tube, is plotted versus S which is the spot location as a percentage of the total distance across the tube face. Assuming constant angular velocity of the beam as it scans across a horizontal scanning line, the line curve B indicates perfect linearity of the scanning action. This condition is not obtained in present tubes due to the flatness of the tube face. It can be proven by the use of simple geometry that the actual scanning action due to the flat tube face is a tangent function. Curve C represents this function plotted to the same coordinates, namely S and $\alpha$. It will be seen from curve C that the result of the flat tube face is effectively to stretch the picture on both the right and left-hand sides of the picture tube face.

Somewhat compensating such non-linearity of scanning, caused by the flat picture tube face, on the right side of the picture tube image area, is the fact that the velocity of scan is not constant even though the variation of scanning current through the horizontal scanning winding varies quite linearly with time. The reason for this is that the resistance in the scanning circuit causes the scanning velocity to vary in an exponential manner. Curve D represents in a particular application the variation of scan caused by such resistance, the actual value of resistance in this case being determined for each angle $\alpha$ of scan. It will be seen from curve D that the flat tube face and the circuit resistance have the effect that the resulting non-linearity effects compensate each other on the right-hand side of the image area while they are additive on the left side of the image area.

To illustrate these points more clearly, Fig. 6 is a graph in which the percent non-linearity N is plotted against $\alpha$ or, more accurately, against a constant multiplied by time. Curve C' represents the percentage magnitude of non-linearity of scan caused by the flat tube face, while curve D' represents the percentage magnitude of non-linearity caused by the inherent resistance in the scanning circuit. Curve E represents the arithmetical sum of the values of curves C' and D' for each angle of $\alpha$. It will be seen from curve E that the non-linearity on the right-hand side of the image area does not exceed approximately 3%, whereas on the left-hand side of the image area the non-linearity has increased to the point where (for a 70° beam deflection, or so-called 70° tube) it reaches 26%.

Keeping in mind the percentage magnitude of non-linearity of scan represented by curve E, and referring again to the horizontal scanning winding magnetic flux distribution represented by the solid-line curves of Fig. 4, it will be apparent that the flux distribution itself produces non-linearity in the horizontal scanning action. This non-linearity is so selected, by choice of the cross-sectional configurations of the skirt portions 13 and 14 of the horizontal winding sections, as closely to compensate on the left-hand side of the image area the large percentage of non-linearity represented by curve E. It will thus be apparent that a scanning yoke embodying the present invention mechanically corrects a major portion of the non-linearity of scan caused by the two major factors contributing to non-linearity, namely a flat tube face and inherent resistance in the scanning circuit. It will further be apparent that this correction remains constant for a given picture size so that the usual linearity-control adjustment may be dispensed with.

The non-uniform magnetic field gradient produced across the neck 12 of the picture tube by a horizontal scanning winding embodying the present invention can produce a minor amount of trapezoidal distortion of the scanned picture area and pincushion distortion of the scanning beam. The pincushion distortion can be compensated by conventional yoke design procedures or other known means. The trapezoidal distortion can be compensated by unequal numbers of turns of the vertical deflecting winding sections 11, 11, to provide a magnetic field distribution somewhat as represented by the broken lines in Fig. 4, or one of the vertical winding sections can be more heavily damped by the use of a shunt resistor across it than in the case of the other winding section. In general, the amount of spot de-focusing that a scanning yoke embodying the present invention introduces is negligible and, in the order of that encountered in conventional yokes for minimizing the pincushion effect.

From the foregoing description of the invention, it will be apparent that a scanning yoke embodying the invention is enabled mechanically to correct with high efficiency certain non-linearities of horizontal scanning action otherwise present or, in the alternative, to correct such non-linearities in a more effective and efficient manner. The scanning yoke of the invention has the further advantage that such correction remains constant regardless of picture size variations from a given picture size, thus permitting the omission from the scanning system of any linearity control component and consequent omission of one adjustment of the scanning system otherwise required. The scanning yoke of the invention also has the advantage that it is adaptable to mass production techniques and provides a substantially improved scanning action without any substantial increment of cost in comparison with conventional scanning yokes.

While there has been described what is at present considered to be a preferred embodiment of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A magnetic scanning yoke for a cathode-ray tube comprising a pair of winding sections of saddle-shaped configuration adapted to saddle opposite sides of the neck of said tube with skirt portions of said sections extending longitudinally of said neck and end portions of said sections partially encircling said neck, the skirt portions of one winding section approximately abutting individual ones of the skirt portions of the other winding section and adjacent skirt portions on one side of said neck having less radial depth and greater circumferential width than on the other side of said neck.

2. A magnetic scanning yoke for a cathode-ray tube comprising two winding sections of saddle-shaped configuration supported to saddle opposite sides of the neck of said tube and connected with aiding magnetic fields, each of said sections having two skirt portions extending longitudinally on individual but approximately opposite sides of said neck and the transverse cross-sectional configurations of adjacent ones of said skirt portions on one side of said neck being thinner radially and wider circumferentially than the adjacent skirt portions on the other side of said neck.

3. A magnetic scanning yoke for a cathode-ray tube comprising a pair of coils of saddle-like configuration adapted to saddle opposite sides of the neck of said tube with side portions of each coil extending longitudinally of said neck and end portions thereof partially encircling said neck, said side portions of each said coil having equal cross-sectional area but unequal cross-sectional dimensions in a plane normal to the axis of said tube.

4. A magnetic scanning yoke for a cathode-ray tube comprising two winding sections of saddle-shaped configuration each having opposed skirt portions and end portions adapted partially to encircle the neck of said tube, one of said opposing skirt portions of each winding section having in a plane transverse the axis of said each section a greater depth and lesser width than the other of said skirt portions and said winding sections being supported to have mirror symmetry with relation to the neck of said tube.

ROBERT R. THALNER.

REFERENCES CITED

The following references are of record in the file of this patent:

UNITED STATES PATENTS

| Number | Name | Date |
|---|---|---|
| 2,152,362 | Ruska | Mar. 28, 1939 |
| 2,406,740 | Buckbee | Sept. 3, 1946 |
| 2,455,171 | Haantjes | Nov. 30, 1948 |
| 2,461,230 | Obert | Feb. 8, 1949 |
| 2,569,343 | Scull | Sept. 25, 1951 |